(12) United States Patent
Hirth et al.

(10) Patent No.: US 8,012,244 B2
(45) Date of Patent: Sep. 6, 2011

(54) METHOD OF REMOVING PARTICULATES FROM EXHAUST GASES, AND CORRESPONDING FIBER LAYER, PARTICULATE FILTER, EXHAUST SYSTEM AND VEHICLE

(75) Inventors: Peter Hirth, Rösrath (DE); Rolf Brück, Bergisch Gladbach (DE); Thomas Härig, Neunkirchen-Seeschied (DE)

(73) Assignees: Emitec Gesellschaft fuer Emissionstechnologie mbH, Lohmar (DE); Toyota Motor Corporation, Aichi (JP)

( * ) Notice: Subject to any disclaimer, the term of this patent is extended or adjusted under 35 U.S.C. 154(b) by 696 days.

(21) Appl. No.: 11/825,803

(22) Filed: Jul. 9, 2007

(65) Prior Publication Data
US 2007/0289276 A1   Dec. 20, 2007

Related U.S. Application Data

(63) Continuation of application No. PCT/EP2006/000717, filed on Jan. 6, 2006.

(30) Foreign Application Priority Data
Jan. 7, 2005   (DE) .......................... 10 2005 000 890

(51) Int. Cl.
*B01D 46/00*   (2006.01)

(52) U.S. Cl. ....... 95/273; 55/385.3; 55/527; 55/DIG. 30

(58) Field of Classification Search .................... 55/527, 55/385.3, 486, 526, DIG. 30, 525, 523, 487; 95/273
See application file for complete search history.

(56) References Cited

U.S. PATENT DOCUMENTS

| | | |
|---|---|---|
| 5,908,480 A | 6/1999 | Ban et al. |
| 6,585,794 B2 | 7/2003 | Shimoda et al. |
| 6,712,884 B2 | 3/2004 | Brück et al. |
| 7,055,314 B2 | 6/2006 | Treiber |
| 7,128,772 B2 | 10/2006 | Brück |
| 7,261,755 B2 | 8/2007 | Brück et al. |
| 2003/0072694 A1 | 4/2003 | Hodgson et al. |
| 2003/0086837 A1 | 5/2003 | Bruck et al. |
| 2003/0097934 A1 | 5/2003 | Bruck et al. |
| 2004/0013580 A1 | 1/2004 | Bruck et al. |
| 2004/0187456 A1 | 9/2004 | Bruck |
| 2004/0194440 A1 | 10/2004 | Bruck et al. |
| 2005/0223688 A1 | 10/2005 | Mei et al. |

FOREIGN PATENT DOCUMENTS

| | | |
|---|---|---|
| DE | 41 41 580 A1 | 6/1993 |
| DE | 201 17 659 U1 | 1/2002 |
| DE | 201 17 873 U1 | 2/2002 |
| DE | 101 53 283 A1 | 5/2003 |
| EP | 0 798 452 A1 | 10/1997 |

(Continued)

*Primary Examiner* — Duane Smith
*Assistant Examiner* — Tiffany N Palmer
(74) *Attorney, Agent, or Firm* — Laurence A. Greenberg; Werner H. Stemer; Ralph E. Locher

(57) ABSTRACT

A method for removing particulates from a gas stream includes providing a gas-permeable filter layer having subregions with a parameter of differing magnitudes in the direction of the layer thickness. This parameter relates at least to the porosity, the fiber diameter of fibers or the fiber type content of the filter layer. The gas stream is divided into partial gas streams which are each passed through different subregions of the filter layer. Fiber layers, particulate filters, exhaust systems and vehicles based on this method are also provided.

24 Claims, 3 Drawing Sheets

FOREIGN PATENT DOCUMENTS

| | | |
|---|---|---|
| EP | 1 317 950 A1 | 6/2003 |
| JP | 2000129311 A | 5/2000 |
| JP | 2002097925 A | 4/2002 |
| JP | 2002233720 A | 8/2002 |
| JP | 2002326009 A | 11/2002 |
| JP | 2002332630 A | 11/2002 |
| JP | 2002357112 A | 12/2002 |
| WO | WO 01/80978 A1 | 11/2001 |
| WO | WO 01/92692 A1 | 12/2001 |
| WO | WO 02/00326 A2 | 1/2002 |
| WO | 03037482 A2 | 5/2003 |
| WO | WO 03/038248 A1 | 5/2003 |

FIG. 1
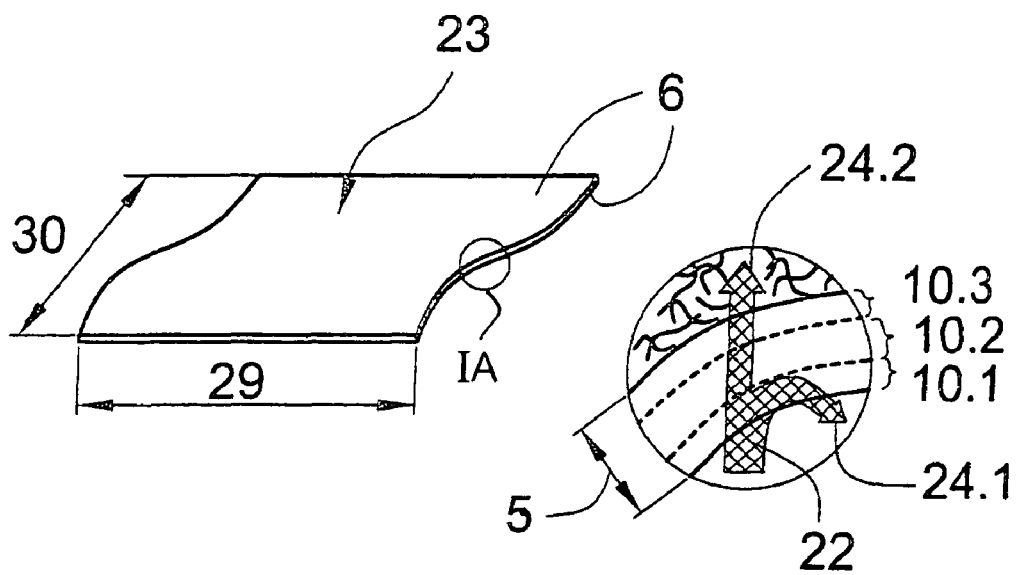
FIG. 1A
FIG. 2
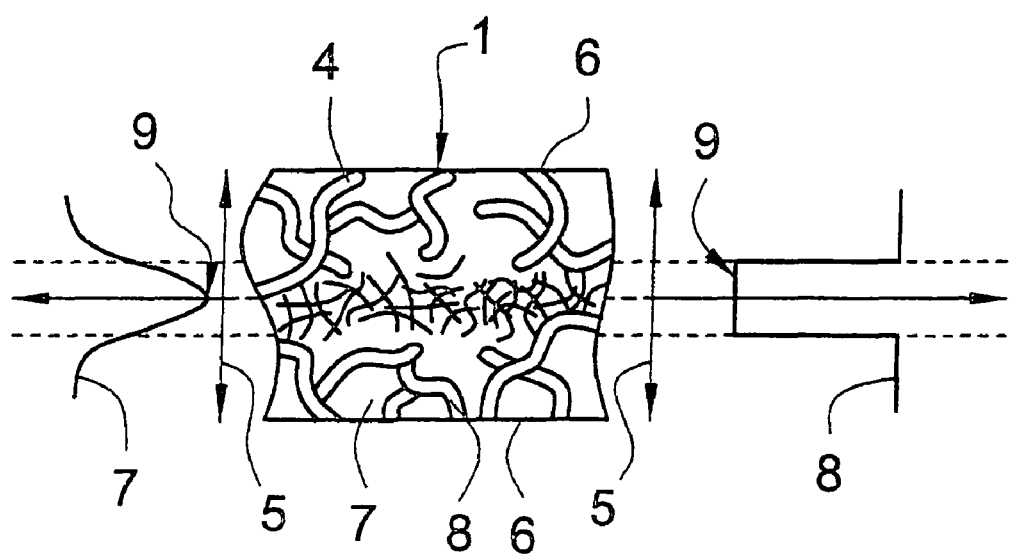

FIG. 3
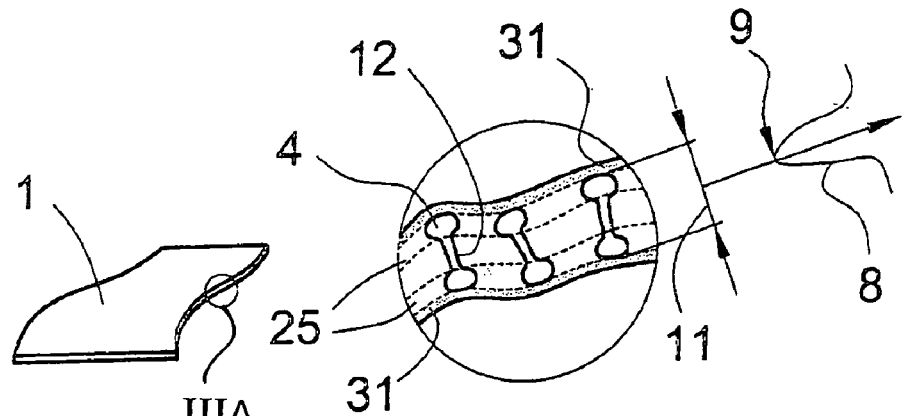
FIG. 3A
FIG. 4A
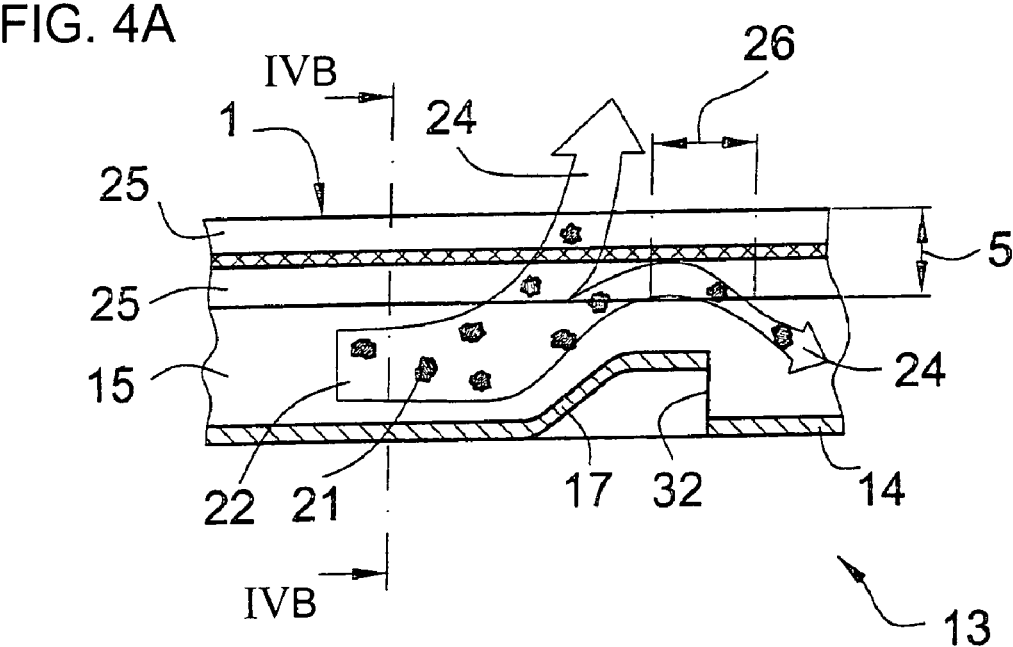
FIG. 4B
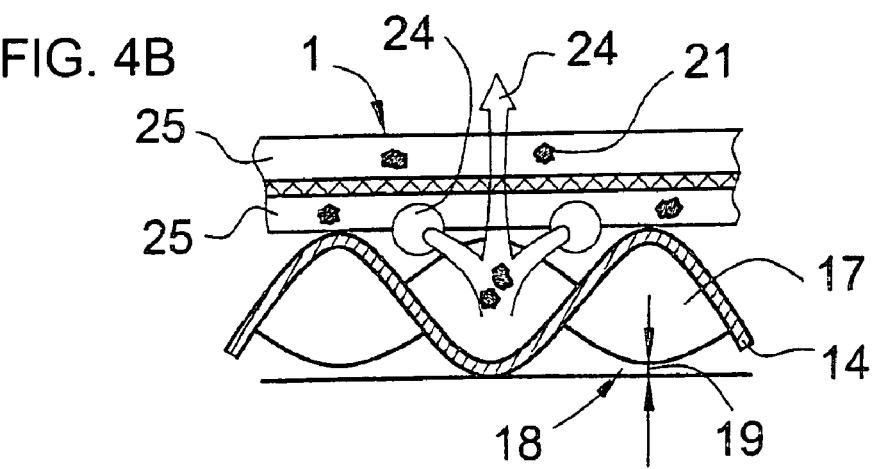

METHOD OF REMOVING PARTICULATES FROM EXHAUST GASES, AND CORRESPONDING FIBER LAYER, PARTICULATE FILTER, EXHAUST SYSTEM AND VEHICLE

CROSS-REFERENCE TO RELATED APPLICATIONS

This is a continuation, under 35 U.S.C. §120, of copending International Application No. PCT/EP2006/000717, filed Jan. 6, 2006, which designated the United States; this application also claims the priority, under 35 U.S.C. §119, of German Patent Application DE 10 2005 000 890.9, filed Jan. 7, 2005; the prior applications are herewith incorporated by reference in their entirety.

BACKGROUND OF THE INVENTION

Field of the Invention

The present invention relates to a fiber layer, which is suitable for use in an exhaust system of a mobile internal combustion engine. The invention also relates to a particulate filter for the same use. Moreover, the invention relates to a method for removing particulates from the exhaust gas of an internal combustion engine having a gas-permeable filter layer. The invention furthermore relates to an exhaust system and a vehicle having the particulate filter.

It is known to use particulate traps which are constructed from a ceramic substrate in order to reduce the level of particulate emissions from exhaust gases from combustion processes. Those traps have channels, so that the exhaust gas which is to be purified can flow into the particulate trap. Adjacent channels are closed off on alternate sides, so that the exhaust gas enters the channel on the inlet side, is forced to pass through a ceramic wall and escapes again along an adjacent channel on the outlet side. Filters of that type achieve an efficiency of approximately 95% across the entire range of particulate sizes which occur.

In addition to undesirable chemical interactions between the particulates and additives and special coatings, the reliable regeneration of a filter of that type in the exhaust system of an automobile still causes problems. It is necessary to regenerate the particulate trap, since the increasing accumulation of particulates in the channel walls through which the exhaust gas is to flow causes the pressure loss across the filter or the back-pressure to rise continuously, which has adverse effects on the engine power. The regeneration generally includes brief heating of the particulate trap or the particulates which have collected therein, so that the particulates are converted into gaseous constituents. That can be achieved, for example, by briefly raising the temperature of the exhaust gas to levels which are sufficient to convert the particulates which have accumulated in the particulate trap, with the aid of an upstream exothermic reaction (e.g. oxidation of additional fuel injected into the exhaust pipe: "afterburning"). However, that high thermal loading of the particulate trap has adverse effects on the service life. Moreover, under certain circumstances it is necessary to monitor the extent of blockage of the particulate trap in order to ensure that a thermal regeneration of that nature should be initiated only at the required times.

In order to avoid such a discontinuous regeneration, which promotes thermal wear, a system (known as CRT: Continuous Regeneration Trap) for the continuous regeneration of filters or particulate traps has been developed. In a system of that type, the particulates are burnt at temperatures of well over 200° C. by oxidation with $NO_2$. The $NO_2$ required for that purpose is often generated by an oxidation catalytic converter disposed upstream of the particulate trap. In that case, however, the problem arises specifically with a view toward use in motor vehicles using diesel fuel that there is only an insufficient level of nitrogen monoxide (NO) which can be converted into the desired nitrogen dioxide ($NO_2$) in the exhaust gas. In that respect, it may under certain circumstances be necessary to add substances or additives which yield NO or $NO_2$ (e.g. ammonia) so as to ultimately allow continuous regeneration of the particulate trap in the exhaust system.

Those fundamental considerations have given rise to a new filter concept, which has mainly become known under the name "open filter system" or "PM cat". Those open filter systems are distinguished by the fact that there is no need for the filter channels to be constructed in such a way that they are closed off on alternate sides. In that context, it is provided that the channel walls are at least in part composed of porous material and that the flow channels of the open filter have diverting and/or guiding structures. Those internal fittings or microstructures in the channels cause the flow or the particulates contained therein to be diverted toward the regions made from porous material. In that context, it has surprisingly emerged that the particulates adhere to and/or in the porous channel wall as a result of interception and/or impacting. The pressure differences in the flow profile of the flow in the exhaust gas are of importance for that effect to occur. The divergence or microstructures additionally make it possible to generate local subatmospheric or superatmospheric conditions, which lead to a filtration effect through the porous channel wall since the above-mentioned pressure differences have to be compensated for.

In that case, the particulate trap, unlike the known closed screen or filter systems, is "open", since there are no blind flow alleys and/or (at least almost) every channel has a cross section which, although it may vary, can ultimately still be flowed through freely. That property can also be used to characterize particulate filters of that type, which means that, for example, the parameter "freedom of flow" is suitable for descriptive purposes. A more extensive description of "open" filter elements of that type is to be found, for example, in German Utility Model DE 201 17 873 U1, corresponding to U.S. Patent Application Publication No. US 2004/0013580 A1; International Patent Application No. WO 02/00326, corresponding to U.S. Patent Application Publication No. US 2003/0097934 A1; International Patent Application No. WO 01/92692, corresponding to U.S. Patent Application Publication No. US 2003/0086837 A1; and International Patent Application No. WO 01/80978, corresponding to U.S. Patent Application Publication No. US 2003/0072694 A1, the contents of the disclosures of which are hereby incorporated in full in the subject matter of the present description and can also be used below for more detailed characterization of filter elements of that type in the context of the present invention.

The provision of suitable materials for the porous channel sections has to be matched to a large number of factors, in particular material, resistance to corrosion, thermal stability, manufacturing suitability, filter efficiency. By way of example, metallic fiber layers which have been configured with a protective sheath so as to comply with some of the factors required in the automotive industry have also been proposed. Those are described, for example, in German Published, Non-Prosecuted Patent Application DE 101 53 283 A1, corresponding to U.S. Patent Application Publication No. US 2004/0194440 A1 or International Patent Application No. WO 03/038248, corresponding to U.S. Pat. No. 7,128,772.

The known "open filter systems" or the filter layers used therein have already proven very successful. Important factors in that context are low pressure loss and the possibility of placing filter systems of that type relatively close to the internal combustion engine, where the particulate traps are usually exposed to an elevated temperature.

SUMMARY OF THE INVENTION

It is accordingly an object of the invention to provide a method for removing particulates from exhaust gases, and a corresponding fiber layer, particulate filter, exhaust system and vehicle, which overcome the hereinafore-mentioned disadvantages of the heretofore-known methods and devices of this general type and which demonstrate a way of making the known particulate filters even more efficient in terms of their purifying action. Moreover, it is intended to provide a fiber layer or filter layer which can be produced at low cost even as part of series production and which is suitable for use in metallic particulate traps, so as to be able to withstand high thermal and dynamic loads in the exhaust system of an automobile for a prolonged period of time.

With the foregoing and other objects in view there is provided, in accordance with the invention, a fiber layer for use in an exhaust system of a mobile internal combustion engine. The fiber layer comprises an assembly of fibers, two opposite surfaces of the fiber layer defining a layer thickness extending between the surfaces, and at least one parameter selected from the group consisting of porosity, fiber diameter and fiber type content, for characterizing the fiber layer. The at least one parameter has a magnitude varying in direction of the layer thickness and the magnitude has an extreme at a distance from the surfaces of the fiber layer.

In the present context, the term "fibers" is to be understood as meaning elongate elements, the fiber length of which is a multiple of the fiber diameter. The fibers have been combined with one another to form a sheet-like layer. The assembly may be of ordered or random nature. Examples of ordered assemblies include knitted fabrics, woven fabrics, meshes. An example of a random assembly is a tangled layer. The fibers may be directly cohesively bonded, but it is also possible for the fibers to be connected to one another by technical joining through additional measures. The preferred manner of producing the technical joining connection is by brazing. However, a sintering process or even welding may be used as well. The fibers or fiber layers are made from a corrosion-resistant material which is able to withstand high temperatures, so that they are able to withstand the ambient conditions in an exhaust system for a prolonged period of time. Important variables for describing the fibers are fiber length, fiber diameter and fiber type content. It is preferable for the fiber length of fibers of this type to be in a range of from 0.05 to 0.4 mm (millimeters). The fiber diameter is usually in a range of less than 0.09 mm, preferably in a range of from 0.015 to 0.05 mm. The configuration of the fibers with respect to one another can be described, inter alia, by the porosity. In this context, the term porosity means the proportion of regions through which media can flow freely within a cross section of the fiber layer. The porosity is usually in a range of from 50% to 90%. The assembly of fibers generally forms cavities, openings or pores, the maximum extent of which is in the range of from 0.001 to 0.1 mm and can be selected on the basis of the particulates that are to be removed. A further parameter is what is known as the fiber type content, a term used to describe the proportion in which the fibers are present when different fiber types or configurations are used to form the fiber layer. For example, if the fiber layer includes a number of fibers ($F_{small}$) with a small fiber diameter, on one hand, and a number of fibers ($F_{large}$) with a larger fiber diameter, on the other hand, the fiber type content results from the ratio of $F_{small}$ or $F_{large}$ to ($F_{small}+F_{large}$). The fiber type content of one type of fibers preferably varies in the range of at least 10%, in particular 20%, over the layer thickness.

In the case of the fiber layer proposed herein, at least one of the characteristic parameters varies in the direction of the layer thickness, with an extreme in the interior of the fiber layer. In this context, the term "fiber layer" is actually only to be understood as meaning the combination of fibers. It does not include additional components of other forms of material (such as for example sheet-metal foils) for producing a filter layer. This does not mean that components of this type may not be present, but rather that they are not taken into consideration in connection with the varying parameters. This has no effect on the configuration of the fiber layer with different types of fiber or fiber layers disposed adjacent one another, which are intended to set the desired fiber layer parameter. This means in particular that the fiber layer has a different construction in edge layers than in central layers.

The term "extreme" is to be understood as meaning a maximum value or a minimum value for the parameter under consideration. In this context, a variation in the magnitudes which is substantially symmetrical with respect to the middle or center of the layer thickness is preferred. This has the advantage that the fiber layer has the same effect from both sides in terms of its filtering action and is therefore easier to produce, transport and process further in terms of manufacturing technology aspects. It is very particularly preferable for the respective extremes to be disposed substantially in a common cross-sectional plane of the fiber layer, i.e., for example, all to be at approximately the same distance from the surface of the fiber layer.

The configuration of the fiber layer proposed herein produces different flow resistances to a gas stream flowing through and/or particulates entrained therein at different depths of the fiber layer. The result of this is that the gas stream advances into different layers or depths of the fiber layer in accordance with the external flow forces and/or pressure differences. This fact can be exploited in order to achieve more effective purification of the gas streams, with an undesirable rise in the pressure loss being avoided at the same time.

In accordance with another feature of the invention, the fiber layer includes metallic fibers. In this context, it is preferable to use iron materials which contain a proportion of at least one of the following alloying elements: aluminum, chromium, nickel. The material itself can preferably be sintered, which means both that the fiber itself is made from sinterable material or produced by the sintering process and that the fibers have been technically joined to one another using the sintering process.

In accordance with a further feature of the invention, the fiber layer has a plurality of subregions, in which at least one of the parameters is constant, in the direction of the layer thickness. In other words, this means that the fiber layer has a stratified or layered structure, with the parameter under consideration being substantially constant within one such stratum or layer. A stratified or layered fiber layer of this type may in principle also include a different fiber material, with the strata or layers ultimately being joined to one another. However, it is preferable to form a fiber layer from one material, in which case the fibers themselves and/or their configuration with respect to one another is configured in such a way that individual strata or layers are formed. This has the advantage of ensuring more stable and durable cohesion of the layers, which is not necessarily the case with strata or layers including different materials and/or strata or layers which are joined to one another by additional technical joining materials.

In accordance with an added feature of the invention, with a stratified or layered structure of the fiber layer of this nature, it is particularly advantageous for there to be an odd number of subregions, with a centrally disposed subregion having the extreme magnitude of the parameter. It is preferable for a fiber layer of this type to have three (or if appropriate five) subregions, with the parameters in the edge layers being selected to be substantially identical and with a differing magnitude of the parameter being present in the centrally disposed subregion. The parameter may, in this case, have a magnitude which changes suddenly or continuously in the boundary region between the individual subregions.

In principle, the layer thickness of a fiber layer or filter layer of this type is in a range of less than 3.0 mm, preferably in a range of from 0.1 mm to 2.0 mm. Fiber layers with a layer thickness in the range of from 0.3 mm to 0.5 mm have given good results for mobile use, with subregions with a thickness of approximately 0.1 mm being formed. The layer thickness may, but does not have to be, divided into subregions which form equal proportions of the overall thickness.

In accordance with an additional feature of the invention, if the fiber layer is configured with a varying porosity, the extreme represents a minimum value. In other words, this means that the porosity of the fiber layer is lowest in an inner, in particular central, region of the fiber layer, i.e. the highest flow resistance for a gas stream flowing through it is present there. This means that for complete flow through the fiber layer there must be a considerable pressure difference, whereas the flow of gases through the edge region can take place even at relatively low pressure differences. Moreover, it should be noted that experience has shown that these subregions of reduced porosity are the first to become blocked with solids or particles, which means that they may be partially blocked until the particulates have been converted into gaseous constituents and the fiber region has been regenerated. Nevertheless, the fiber layer usually still has some filtering action at these locations, since the exhaust gas or gas stream can still flow through the edge layers of the fiber layers and can therefore continue to be purified.

In accordance with yet another feature of the invention, if the fiber diameter is configured to be variable over the layer thickness of the fiber layer, it is preferably proposed that the extreme represent a minimum value. In other words, this means that fibers in an interior subregion of the fiber layer have a smaller fiber diameter than fibers in the edge layers. Tests have shown that the efficiency of the fibers in terms of their purifying action and/or their potential to accumulate particulates increases as the fiber diameter decreases. This therefore means that in this case there is a fiber layer which is particularly efficient in central regions, whereas edge regions are less efficient. By way of example, the fibers in the central region may, for example, be used with a fiber diameter of less than 50 µm (micrometers) or even less than 25 µm, whereas, for example, fibers with a fiber diameter in the range of from 50 µm to 100 µm may be present in the edge region.

In accordance with yet a further feature of the invention, by way of example, it is also possible for the fiber type content to be configured so as to vary across the layer thickness of the fiber layer, in which case fibers ($F_{small}$) with a smaller fiber diameter and fibers ($F_{large}$) with a larger fiber diameter are mixed or combined with one another. It is particularly preferable for the $F_{small}$ fibers to have a fiber diameter in the range from 20-25 µm (micrometers), whereas the $F_{large}$ fibers are constructed with a fiber diameter in the range of from 35-45 µm. The extreme of the fiber type content parameter in this case is preferably in the range of from $F_{small}$=approximately 0.3-0.4 to $F_{large}$=approximately 0.7-0.6. A fiber type content of this nature has given particularly advantageous results with regard to particulate separation if it is kept substantially constant across the layer thickness. However, further advantages can also be achieved if the fiber type content close to at least one edge region is in the range of from $F_{small}$=0.0-0.2 to $F_{large}$=1.0-0.8.

In accordance with yet an added feature of the invention, at least some of the fibers have a fiber diameter which varies over their fiber length. In other words, this means that the fiber layer does not have to be produced with fibers of different configurations, but rather at least some of the fibers themselves are provided with a varying fiber diameter. This considerably simplifies the production of fiber layers of this type having varying parameters, in particular in series production.

In accordance with yet an added feature of the invention, the magnitude of the fiber diameter represents an extreme, in particular a minimum value, in a central portion of the fiber. In other words, this means that fibers which have two thick ends and a slender middle portion are provided. These fibers can then be combined with one another in such a way that, for example, the portions of the fibers having the same fiber diameter are disposed adjacent one another (in particular substantially in a cross-sectional plane parallel to the surface), and in this way different strata or layers are formed in the fiber layer.

With the objects of the invention in view, there is also provided a particulate filter for use in an exhaust system of a mobile internal combustion engine. The particulate filter comprises a honeycomb body having at least one fiber layer and at least one at least partially structured sheet together forming channels. At least some of the channels have at least one microstructure. The at least one fiber layer has a layer thickness and at least one parameter varying in direction of the layer thickness.

The at least one parameter is selected from the group consisting of porosity and fiber diameter. In this context, a particulate filter having a configuration of the fiber layer which has been described above in accordance with the invention is very particularly preferred.

This particulate filter is preferably what is known as an "open filter system" as described in the introduction, in which context the contents of the disclosure of the above-mentioned prior art disclosed in German Utility Model DE 201 17 873 U1, corresponding to U.S. Patent Application Publication No. US 2004/0013580 A1; International Patent Application No. WO 02/00326, corresponding to U.S. Patent Application Publication No. US 2003/0097934 A1; International Patent Application No. WO 01/92692, corresponding to U.S. Patent Application Publication No. US 2003/0086837 A1; and International Patent Application No. WO 01/80978, corresponding to U.S. Patent Application Publication No. US 2003/0072694 A1, can be used for additional explanation over and above the following description. All currently known methods, in particular continuous and discontinuous methods, can be used to regenerate the particulate filter according to the invention, but continuous regeneration using the "CRT" method is preferred.

The configuration of the particulate filter with a honeycomb body is fundamentally known. In this case, a multiplicity of channels disposed substantially parallel to one another are formed, connecting an inlet side of the honeycomb body to an outlet side of the honeycomb body. The exhaust gas which is to be purified flows in through the inlet end side and passes through the channels as partial exhaust-gas streams.

The microstructures effect pressure differences in the interior of the honeycomb body, so that the partial exhaust-gas streams at least partially penetrate through the fiber layer and are purified in the process. Honeycomb bodies of this type are preferably constructed with a cell density of at least 100 cpsi, preferably in the range of from 150 cpsi to 400 cpsi (cpsi: cells per square inch; 1 cpsi corresponds to one channel per 6.4516 square centimeters). The channels are usually each delimited by a subregion of the structured sheet and a subregion of the fiber layer. The sheet is likewise made from a corrosion-resistant material which is able to withstand high temperatures, in particular a metallic material. It is constructed with a sheet thickness (foil thickness) of less than 100 μm (micrometers) and preferably has a recurring (macro-)structure, e.g. a corrugation. Both the sheet and the fiber layer may be at least partially provided with one or various coatings, if appropriate also including catalytically active material. In order to ensure a permanent joining of sheets and fiber layers, they are joined to one another, in particular by brazing or welding.

In accordance with another feature of the invention, the at least one microstructure is disposed in such a way in a channel that a gas stream flowing through it is diverted toward the at least one fiber layer. For this purpose, the microstructure may be constructed as a guide surface, elevation, projection, etc., in order to provide pressure differences and/or flow-facing edges and thereby to divert the gas stream, which usually flows in laminar form inside the channel, toward the fiber layer. The entrained particulates are also diverted, together with the gas stream, toward the fiber layer, where they ultimately accumulate as they pass through or come into contact with the fiber layer. The residence time of the particulates in the interior of the channel, the fiber layer or the particulate filter is then maintained until at least a large proportion of them are converted into gaseous constituents. For this purpose, it is possible to carry out thermal conversion as well as conversion or regeneration using nitrogen oxides.

In accordance with a further feature of the invention, the particulate filter is configured in such a way that the microstructure and fiber layer form a gap with a gap width of less than 1.5 mm. It is advantageous for the gap width to be approximately 1.0 mm or in a range between 0.5 mm and 0.8 mm. In principle, it should be noted that a plurality of microstructures may be provided in the interior of a channel, in which case the gap does not have to be of identical construction either within a channel or in adjacent channels. However, the provision of a gap ensures that an "open filter system" is produced. Consequently, at least part of the gas stream flowing through the channel is made to bypass the microstructure without completely penetrating through the fiber layer. The size and/or shape of the microstructure has a considerable influence on the flow diversion toward or through the fiber layer.

In the configuration of the fiber layer with parameters which vary in the direction of the layer thickness which is proposed herein, the result of this is that some of the exhaust gas or gas stream penetrates through the fiber layer and in this way enters an adjacent channel, while a further part of the exhaust gas or gas stream continues to flow along the channel, bypassing the microstructure. Configuring the fiber layer with an edge layer which represents a lower flow resistance to the gas stream than centrally disposed layers allows this "bypass" partial gas stream to at least partially penetrate through the edge layer and thus likewise enables some of the particulates entrained therein to be deposited on the fibers. This increases the efficiency of the particulate filter with regard to the removal of particulates, in particular carbon particulates, from a gas stream, in particular an exhaust gas from an internal combustion engine.

With the objects of the invention in view, there is also provided an exhaust system of an internal combustion engine. The exhaust system comprises the particulate filter according to the invention. The term internal combustion engine is to be understood in particular as meaning engines which produce an exhaust gas containing solid particulates. A mobile engine which burns diesel fuel is of particular importance in this context.

With the objects of the invention in view, there is additionally provided a vehicle, comprising a particulate filter of the type described above. Vehicles are mentioned as a preferred use in addition to other application areas (lawn mowers, chain saws, etc.) since statutory provisions require particularly efficient purification of the exhaust gases from vehicles. This applies in particular to passenger automobiles and trucks.

With the objects of the invention in view, there is concomitantly provided a method for removing particulates from a gas stream. The method comprises providing a gas-permeable filter layer having fibers, a layer thickness and subregions with a parameter of differing magnitudes in direction of the layer thickness. The parameter relates at least to a porosity or a fiber diameter of the fibers. The gas stream is divided into partial gas streams each passing through different subregions of the filter layer.

In other words, this means that although the partial gas streams may equally well flow through one subregion or a few subregions of the filter layer together, they are ultimately divided, with one of the partial gas streams flowing through other and/or further subregions of the filter layer. This is intended in particular to express the fact that separation into the respective partial gas streams takes place not in the direction of the surface of the filter layer, but rather in the direction of its layer thickness. This means in particular that a partial gas stream completely flows through the gas-permeable filter layer, whereas another part of the gas stream only penetrates into the gas-permeable filter layer but emerges again on the same side or surface without completely flowing through the filter layer. The partial gas streams differ in this context, for example, with regard to their direction of flow, their flow velocity, their temperature, the extent to which they are laden with particulates, etc.

In accordance with another mode of the invention, as has already been stated above, it is particularly advantageous for a partial gas stream to be passed only through at least one edge layer of the filter layer, whereas a further partial gas stream flows through all of the subregions of the filter layer. In this context, it should also be noted that the term filter layer is to be understood as meaning both a fiber layer of the type according to the invention as well as a filter layer composed of other materials or substances which likewise have magnitudes of the above-mentioned parameters which vary in the direction of the layer thickness, with an extreme of these magnitudes being at a distance from the surfaces of the filter layer.

In accordance with a further mode of the invention, the partial gas stream which flows through only the edge layer is guided along a filter distance through the edge layer. This filter distance at least corresponds to the layer thickness of the filter layer. This means that the partial gas stream which does not completely flow through the filter layer (bypass) is in contact with the filter material over at least the same distance of flow path. As has already been stated, the efficiency of the layers or subregions of the filter layer may differ, but by ensuring the filtering distance described herein it is ensured that at least a proportionate filter action is achieved for this exhaust gas which is only passed through the filter material in the edge layers. It is preferable for the filter distance to be lengthened by the factor by which the adjacent strata or layers differ in terms of their efficiency or another parameter. The filter distance can be effected by the targeted provision of pressure differences or forced flow profiles, for example by the specific configuration of microstructures in a flow channel which is delimited by a gas-permeable filter layer of this type.

In accordance with a concomitant mode of the invention, a quantitative determination of the respective partial gas streams is effected by the filter layer itself. In other words, this means that the configuration of the filter layer itself has measures responsible for dividing the overall gas stream into partial gas streams. These measures may be realized by different configurations of the parameters of the fiber layer, i.e. they may also be inherent. For example, the configuration of the filter layer with different flow resistances or porosities in the direction of the layer thickness constitutes one possible way of effecting a quantitative determination or division of this type.

The method described herein can be realized particularly successfully with one of the proposed fiber layers according to the invention and/or a proposed configuration of the particulate filter according to the invention.

Other features which are considered as characteristic for the invention are set forth in the appended claims, noting that the features recited individually in the claims can be combined with one another in any technologically expedient way and represent further advantageous configurations of the invention.

Although the invention is illustrated and described herein as embodied in a method for removing particulates from exhaust gases, and a corresponding fiber layer, particulate filter, exhaust system and vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a diagrammatic, perspective view of a filter layer which is suitable for the method according to the invention;

FIG. 1A is an enlarged, perspective view of a portion IA of FIG. 1;

FIG. 2 is an enlarged, fragmentary view of a fiber layer according to the invention;

FIGS. 3 and 3A are views similar to FIGS. 1 and 1A, of a further configuration of the fiber layer according to the invention;

FIGS. 4A and 4B are respective fragmentary, longitudinal-sectional and cross-sectional views of a channel of an embodiment of the particulate filter, in which FIG. 4B is taken along a line IVB-IVB of FIG. 4A, in the direction of the arrows;

DETAILED DESCRIPTION OF THE INVENTION

Figure 5:
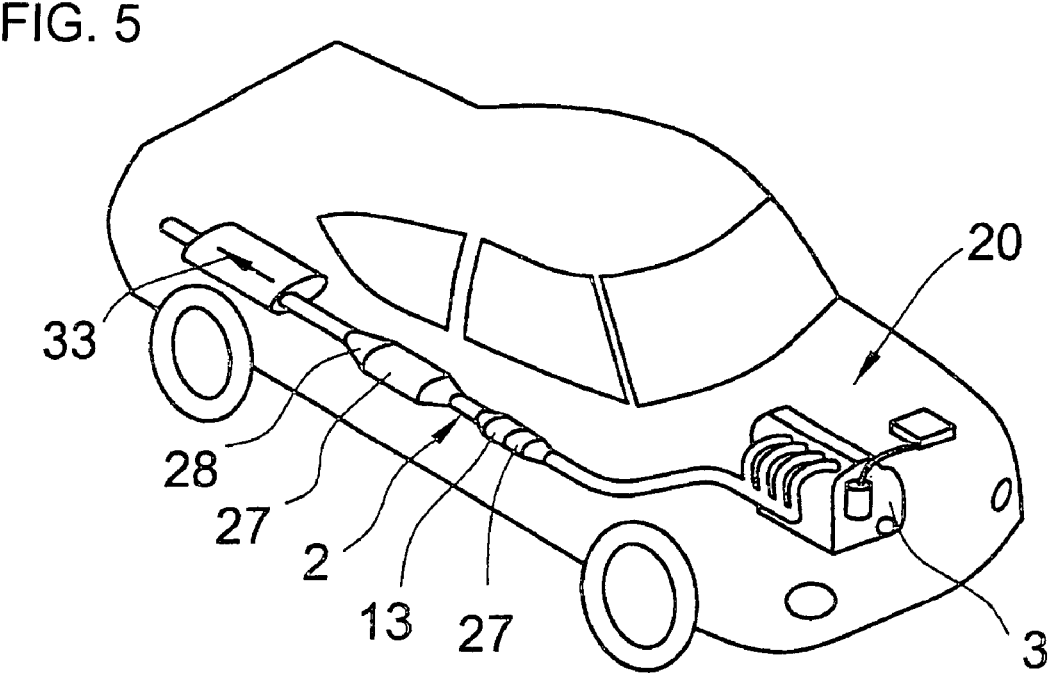
FIG. 5 is a perspective view of a vehicle having an exhaust system.

Referring now to the figures of the drawings in detail and first, particularly, to FIGS. 1 and 1A thereof, there is seen a diagrammatic and perspective view of a filter layer 23, which is usually provided in a predetermined layer length 29 and layer width 30. The filter layer 23, as well as a fiber layer 1 shown in FIG. 2, is delimited by two surfaces 6 which ultimately define a layer thickness 5 of the filter layer 23. The gas-permeable filter layer 23 has a plurality of subregions 10, namely respective first, second and third subregions 10.1, 10.2 and 10.3, in the direction of this layer thickness 5, which differ on the basis of parameters that describe the filter layer 23. The parameters which are characteristic of the filter layer 23 include, for example, a porosity 7 or a fiber diameter 8 of fibers 4, if the filter layer 23 is constructed as a fiber layer 1.

As can be seen from FIG. 1A, a gas stream 22 which impinges on the filter layer 23 will partially penetrate into inner regions of the filter layer 23. After the entire gas stream 22 has penetrated through the first subregion 10.1, it reaches the second subregion 10.2. This second subregion 10.2, which is disposed in a central region, has a porosity and/or fiber diameter which is impenetrable to part of the gas stream 22. Accordingly, a first partial gas stream 24.1 is deflected at a transition to the second subregion 10.2 and flows back through the first subregion 10.1 before leaving the filter layer 23. However, a second partial gas stream 24.2 which, for example, has a higher flow velocity or a lower level of particulates, etc., penetrates through the second subregion 10.2. Then, the second partial gas stream 24.2 passes into the adjacent third subregion 10.3, flows through the latter and emerges again on the opposite surface 6. Both the first partial gas stream 24.1 and the second partial gas stream 24.2 were in contact with at least the first subregion 10.1 of the filter layer 23. However, whereas the first partial gas stream 24.1 only flowed through a subregion 10.1, the second partial gas stream 24.2 passed through all of the subregions 10.1, 10.2, 10.3. In this case, the quantitative determination of the partial gas streams 24 was effected by the filter layer 23 itself, since it presents different flow resistances in its subregions 10, leading to such a division of the gas stream 22.

FIG. 2 diagrammatically depicts a portion of a fiber layer 1. Fibers 4 with a first fiber diameter 8 are provided in the vicinity of the surfaces 6 which delimit the fiber layer 1. Fibers 4 are also provided in a central region but have a different fiber diameter 8. The differently shaped fibers 4 are permanently technically joined to one another and form a random assembly, with a porosity 7 being realized at the same time. In addition to this fragmentary view of a fiber layer 1, the left-hand and right-hand sides of the figure diagrammatically depict profiles of magnitudes of the parameters of the porosity 7 and fiber diameter 8 over the layer thickness 5.

The left-hand side of FIG. 2 illustrates the profile of the porosity 7. An extreme 9 where the porosity 7 is lowest is located in the central region, i.e. at a distance from the surfaces 6. The profile of the porosity 7 is substantially symmetrical with respect to a middle stratum or layer of the fiber layer 1 and configured with continuous transitions.

Similarly, the right-hand side of FIG. 2 illustrates the profile of the fiber diameter 8 over the layer thickness 5. Due to the fact that fibers 4 with a small fiber diameter 8 are provided in the central region and fibers 4 with a thicker fiber diameter 8 are provided in the edge layers, there is a sudden change in the fiber diameters 8, as is illustrated on the right-hand side. An extreme 9 is once again formed in the central region.

FIG. 3 once again diagrammatically depicts a fiber layer 1 with a particularly pronounced detail. FIG. 3A shows the fiber layer 1 with a coating 31 on both surfaces of the fiber layer 1. The coating may, of course, also extend into inner regions or even over all free surfaces of the fibers 4. The fiber layer 1 is configured in this case as an ordered combination of fibers 4, in which the fibers 4 are constructed with a fiber diameter 8 which varies over their fiber length 11. For this purpose, the fibers 4 have a central portion 12, in which the fiber diameter 8 reaches an extreme 9, as can also be seen diagrammatically on the right-hand side from the illustrated profile. In the example shown therein, the fiber diameters 8 are selected to be different in the vicinity of each surface 6, so that in this case the profile of the fiber diameters 8 is not symmetrical over the fiber length 11 or layer thickness 5. The identical, ordered orientation or alignment of the fibers 4 once again causes the formation of edge layers 25 which provide a configuration of the fiber layer 1 with parameters which vary in the direction of the layer thickness 5. With the configuration of the fibers 4 illustrated herein it is also possible to provide further fibers 4 (for example of a different material or with a constant fiber diameter) in a subregion of the fiber layer 1, in which the further fibers are integrated in the fiber combination.

FIGS. 4A and 4B are diagrammatic illustrations, in the form of fragmentary sectional views, of the structure of a particulate filter 13 according to the invention, which is suitable for use in an exhaust system of a mobile internal combustion engine. The particulate filter 13 includes a fiber layer 1 with at least one parameter, selected from the group consisting of porosity and fiber diameter, which varies in the direction of a layer thickness 5 and at least one at least partially structured sheet 14, which together form a plurality of channels 15. In the embodiment illustrated, the sheet 14 has microstructures 17. A channel 15 of this type is illustrated in detail in the form of a longitudinal section in FIG. 4A. FIG. 4B diagrammatically indicates a cross section through the channel 15, which is taken along a cross-sectional plane indicated in FIG. 4A, in the direction of viewing.

The mode of action is explained in more detail below. A gas stream 22 carrying particulates 21, in particular an exhaust gas stream, flows through the channel 15, where it impinges on a microstructure 17 which projects into the channel 15. The result of this is that the gas stream 22 is diverted toward the fiber layer 1. The fiber layer 1 has edge layers 25 and a central layer in the interior. Whereas the entire gas stream 22 penetrates through the first edge layer 25, a middle layer, due to its parameters (such as for example porosity and/or fiber diameter), forms a flow resistance to a partial gas stream 24 which is such that the partial gas stream does not penetrate through this layer. Rather, this deflected partial gas stream 24 flows along a filter distance 26 through the edge region 25 before ultimately emerging back into the channel 15. Another part of the gas stream 22 penetrates through this middle layer and also the edge layer 25 which adjoins it and emerges again on the opposite surface. As the gas stream 22 flows through the fiber layer 1, the entrained particulates 21 collect on the fibers 4 of the fiber layer 1, so that ultimately the gas stream 22 is purified.

The microstructures 17 are provided for the purpose of flow diversion and/or for producing pressure differences in adjacent channels 15. These microstructures 17 include projections which are worked into the material or structure of the sheet 14. It is possible to use pure deformation steps, but it is also possible for microstructures 17 of this type to be produced by stamping or other cutting processes, in which case openings 32 are generally introduced into the sheet 14. This also provides flow communication between adjacent channels 15, so that the exhaust gas which is to be purified can be mixed again and again. The microstructures 17, which are formed in this case as guiding surfaces, form a gap 18 together with the fiber layer 1, which gap has a predetermined gap width 19. The configuration of the microstructure 17 and the configuration of the fiber layer 1, as well as the characteristics of the flow of the gas stream 22, now effect quantitative division into various partial gas streams 24.

FIG. 5 shows a diagrammatic and perspective view of a vehicle 20 including an internal combustion engine 3 with an associated exhaust system 2. The exhaust gas which is generated in the internal combustion engine 3 flows through the exhaust system in a preferred direction of flow 33 and, after it has been purified, is released to the environment. The exhaust system 2 includes an exhaust pipe 28 in which a plurality of different exhaust-gas treatment devices are provided in series. In the present case, the exhaust gas flows through the following components in succession: oxidation catalytic converter 27, particulate filter 13 and catalytic converter 27. In principle, however, the particulate filter 13 can be integrated in any combination of known exhaust-gas treatment devices. Connecting an oxidation catalytic converter 27 and a particulate filter 13 in series as shown herein in particular allows continuous regeneration of the particulate filter in accordance with the "CRT" principle described in the introduction hereto.

Figure 6:
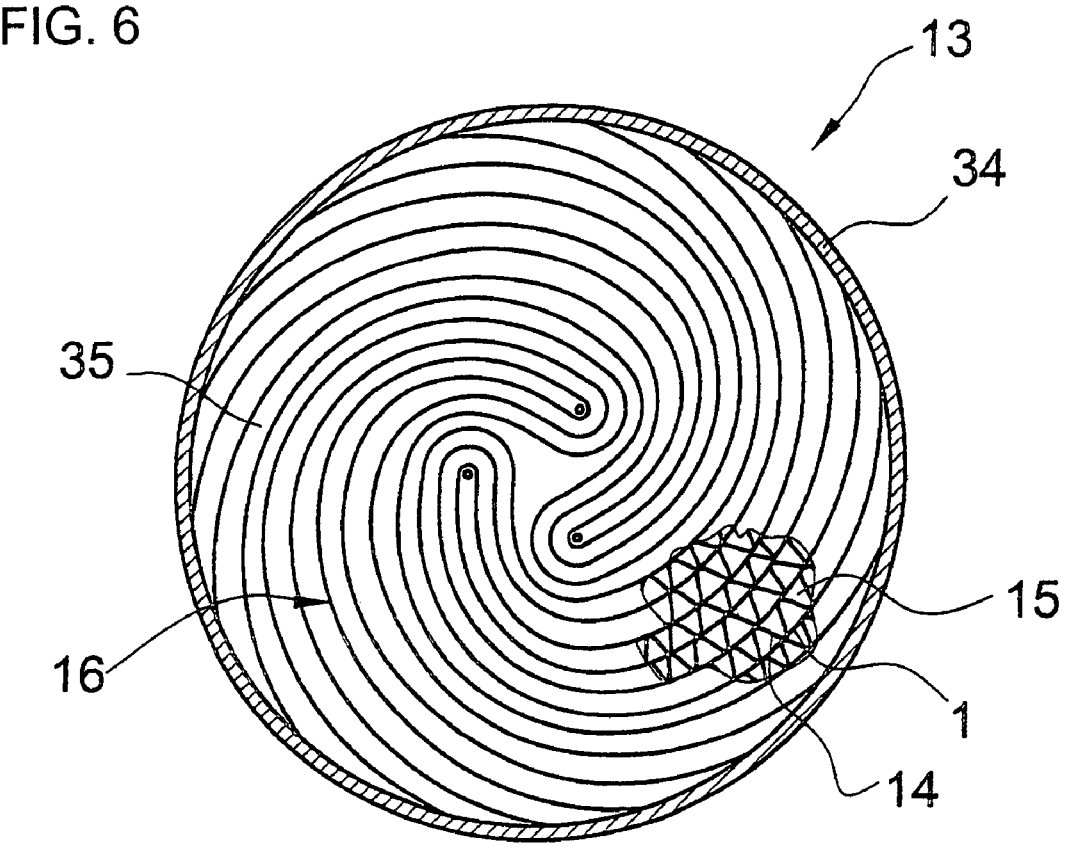
FIG. 6 is a cross-sectional view of a structure of a particulate filter.

FIG. 6 diagrammatically depicts an end view of a particulate filter 13 which includes a housing 34 and a honeycomb body 16 located therein. The honeycomb body 16 is formed with a plurality of stacks 35 of fiber layers 1 and sheets 14 which have been wound together. The alternately stacked fiber layers 1 and structured sheets 14 form channels 15 through which an exhaust gas can flow. Non-illustrated microstructures 17, which cause the gas streams 22 to flow through the fiber layer 1, are provided in the interior of the channels.

The invention described herein allows particularly efficient removal of particulates from exhaust gases of mobile internal combustion engines.

The invention claimed is:

1. A fiber layer for use in an exhaust system of a mobile internal combustion engine, the fiber layer comprising:
   an assembly formed only of combinations of fibers;
   two opposite surfaces of the fiber layer defining a layer thickness extending between said surfaces;
   a porosity parameter characterizing the fiber layer;
   said porosity parameter having a magnitude varying in direction of said layer thickness; and
   said magnitude having an extreme representing a minimum value at a distance from said surfaces of the fiber layer.

2. The fiber layer according to claim 1, wherein said fibers include metallic fibers.

3. The fiber layer according to claim 1, which further comprises a plurality of subregions of the fiber layer, said porosity parameter being constant, in direction of said layer thickness, in each of said subregions.

4. The fiber layer according to claim 3, wherein said subregions include an odd number of said subregions having a centrally disposed subregion with said extreme magnitude of said porosity parameter.

5. The fiber layer according to claim 1, wherein at least some of said fibers have a fiber length and a fiber diameter varying over said fiber length.

6. The fiber layer according to claim 5, wherein a magnitude of said a fiber diameter in a central section represents an extreme.

7. A particulate filter for use in an exhaust system of a mobile internal combustion engine, the particulate filter comprising:
   a honeycomb body having at least one fiber layer formed only of combinations of fibers and at least one at least partially structured sheet together forming channels, at least some of said channels having at least one microstructure;

said at least one fiber layer having two opposite surfaces defining a layer thickness extending between said surfaces and a porosity parameter having a magnitude varying in direction of said layer thickness; and said magnitude having an extreme representing a minimum value at a distance from said surfaces of said at least one fiber layer.

8. The particulate filter according to claim 7, wherein said at least one microstructure disposed in a channel diverts a gas stream flowing through said channel toward said at least one fiber layer.

9. The particulate filter according to claim 7, wherein said at least one microstructure and said at least one fiber layer define a gap therebetween having a gap width of less than 1.5 millimeters.

10. An exhaust system of an internal combustion engine, the exhaust system comprising the particulate filter according to claim 7.

11. A vehicle, comprising the particulate filter according to claim 7.

12. A method for removing particulates from a gas stream, the method comprising the following steps:

providing a gas-permeable filter layer formed only of combinations of fibers, and having a layer thickness and subregions with a porosity parameter of differing magnitudes in direction of the layer thickness;

providing the filter layer with two opposite surfaces defining a layer thickness extending between the surfaces;

providing the magnitudes with an extreme representing a minimum value at a distance from the surfaces of the filter layer; and dividing the gas stream into partial gas streams each passing through different subregions of the filter layer.

13. The method according to claim 12, which further comprises passing one partial gas stream only through at least one edge layer of the filter layer, and passing a further partial gas stream through all of the subregions.

14. The method according to claim 13, which further comprises passing the partial gas stream which comes into contact only with the at least one edge layer through a filter distance corresponding to at least the layer thickness of the filter layer.

15. The method according to claim 12, wherein a quantitative determination of the respective partial gas streams is effected by the filter layer itself.

16. The fiber layer according to claim 1, wherein said assembly of fibers includes fibers being directly cohesively bonded to one another.

17. The particulate filter according to claim 7, wherein said at least one fiber layer includes fibers being directly cohesively bonded to one another.

18. The method according to claim 12, which further comprises directly cohesively bonding the fibers to one another.

19. The fiber layer according to claim 1, wherein the fiber layer is also characterized by at least one parameter selected from the group consisting of fiber diameter and fiber type content.

20. The particulate filter according to claim 7, wherein said fiber layer also has at least one parameter selected from the group consisting of fiber diameter and fiber type content.

21. The method according to claim 12, wherein the fiber layer also has at least one parameter selected from the group consisting of fiber diameter and fiber type content.

22. A fiber layer for use in an exhaust system of a mobile internal combustion engine, the fiber layer comprising:

an assembly of fibers;

two opposite surfaces defining a layer thickness extending between said surfaces;

an odd number of subregions in direction of said layer thickness including a centrally disposed subregion and other subregions;

said subregions having fiber diameters; and said fiber diameter of said centrally disposed subregion being larger or smaller than said fiber diameters of said other subregions.

23. A particulate filter for use in an exhaust system of a mobile internal combustion engine, the particulate filter comprising:

a honeycomb body having at least one fiber layer and at least one at least partially structured sheet together forming channels, at least some of said channels having at least one microstructure;

said at least one fiber layer having two opposite surfaces defining a layer thickness extending between said surfaces, and an odd number of subregions in direction of said layer thickness including a centrally disposed subregion and other subregions, said subregions having fiber diameters, and said fiber diameter of said centrally disposed subregion being larger or smaller than said fiber diameters of said other subregions.

24. A method for removing particulates from a gas stream, the method comprising the following steps:

providing a gas-permeable filter layer having fibers, two opposite surfaces defining a layer thickness extending between the surfaces and an odd number of subregions in direction of the layer thickness including a centrally disposed subregion and other subregions, the subregions having fiber diameters, and the fiber diameter of the centrally disposed subregion being larger or smaller than the fiber diameters of the other subregions; and dividing the gas stream into partial gas streams each passing through different subregions of the filter layer.

* * * * *